US012748586B2

(12) United States Patent
Vergara et al.

(10) Patent No.: US 12,748,586 B2
(45) Date of Patent: Sep. 29, 2026

(54) ORCHESTRATION OF SOFTWARE RELEASES ON A CLOUD PLATFORM ACROSS STAGGER GROUPS

(71) Applicant: Salesforce, Inc., San Francisco, CA (US)

(72) Inventors: Jeaneth Aguilar Vergara, Granite Bay, CA (US); Kim Ho, British Columbia (CA)

(73) Assignee: Salesforce, Inc., San Francisco, CA (US)

( * ) Notice: Subject to any disclaimer, the term of this patent is extended or adjusted under 35 U.S.C. 154(b) by 217 days.

(21) Appl. No.: 18/135,010

(22) Filed: Apr. 14, 2023

(65) Prior Publication Data

US 2024/0345830 A1 Oct. 17, 2024

(51) Int. Cl.
*G06F 8/658* (2018.01)
*G06F 8/71* (2018.01)

(52) U.S. Cl.
CPC ................ *G06F 8/658* (2018.02); *G06F 8/71* (2013.01)

(58) Field of Classification Search
None
See application file for complete search history.

(56) References Cited

U.S. PATENT DOCUMENTS 9,652,211 B2 * 5/2017 Rachamadugu .......... G06F 8/70
10,459,709 B1 * 10/2019 Troutman ................. G06F 8/65
10,681,176 B1 * 6/2020 Lewis ....................... G06F 8/60
11,327,877 B2 * 5/2022 Joshi .................... G06F 11/3688
11,354,113 B1 * 6/2022 Verma .................. H04L 41/082
11,356,508 B1 * 6/2022 Vergara .................. H04L 67/06
11,544,052 B2 * 1/2023 Liljeback .................. G06F 8/60
11,734,120 B2 * 8/2023 Dachere .............. G06F 11/3051 707/649
12,204,892 B2 * 1/2025 Ashrafzadeh ....... G06F 9/45512
2009/0183146 A1 * 7/2009 Zorn ......................... G06F 8/61 726/1
2017/0177324 A1 * 6/2017 Frank .................... G06F 16/958
2017/0364345 A1 * 12/2017 Fontoura .................. G06F 9/52
2021/0311760 A1 * 10/2021 Oki ....................... H04L 47/803
2022/0050674 A1 * 2/2022 Liljeback .................. G06F 8/60
2022/0088494 A1 * 3/2022 Bamba .................... A63F 13/63
2022/0171863 A1 * 6/2022 Green ..................... G06F 21/87
2022/0174132 A1 * 6/2022 Kiselev ................... H04L 67/10
2022/0179629 A1 * 6/2022 Kiselev ...................... G06F 8/61
2022/0222079 A1 * 7/2022 Vergara ................ G06F 9/3869
2022/0222125 A1 * 7/2022 Vergara ..................... G06F 8/60
2022/0236975 A1 * 7/2022 Wiegley ................ H04L 67/535
2022/0236976 A1 * 7/2022 Wiegley .................... G06F 8/71
(Continued)

*Primary Examiner* — Jason D Mitchell
(74) *Attorney, Agent, or Firm* — Kwan & Olynick LLP

(57) ABSTRACT

A multi-tenant system receives a request to build a software artifact for deploying on one or more target datacenter entities of the datacenter configured on the could platform. A software artifact comprises executable instructions associated with a service configured for execution on one or more cloud platforms. The system generates a release configuration that includes reusable release components and is used as a template by the release orchestration system to orchestrate release of the software artifact. The release configuration may specify one or more stagger groups, or a group of target datacenter entities that can be rolled-out in parallel.

19 Claims, 9 Drawing Sheets

(56) References Cited

U.S. PATENT DOCUMENTS

2022/0239736 A1* 7/2022 Magana Perdomo .. H04L 67/02
2022/0350670 A1* 11/2022 Magana Perdomo ........................ G06F 9/5072
2023/0054760 A1* 2/2023 Kiselev ..................... G06F 8/10
2023/0108524 A1* 4/2023 Mahajan ............... G06F 9/5077 717/177
2023/0168872 A1* 6/2023 Hang .................. G06F 9/44505 715/762
2023/0171243 A1* 6/2023 Peddada ............. H04L 61/4505 726/7
2023/0171244 A1* 6/2023 Peddada ............. G06F 16/2272 726/7
2023/0171323 A1* 6/2023 Peddada ................. H04L 67/34 709/217
2023/0342122 A1* 10/2023 Shpilyuck ................. G06F 8/65
2024/0036929 A1* 2/2024 Moyes .................. G06F 9/5072
2024/0103834 A1* 3/2024 Shemer ..................... G06F 8/71
2024/0201975 A1* 6/2024 Muslimov ................. G06F 8/60
2024/0256250 A1* 8/2024 Bokka ....................... G06F 8/65
2024/0256251 A1* 8/2024 Vergara ..................... G06F 8/60
2024/0256297 A1* 8/2024 Dhruvakumar ..... G06F 9/44594

* cited by examiner

Replacement Sheet

ORCHESTRATION OF SOFTWARE RELEASES ON A CLOUD PLATFORM ACROSS STAGGER GROUPS

BACKGROUND

Field of Art

This disclosure relates in general to management of software releases in cloud computing platforms, and in particular to orchestration of software releases for continuous delivery on data centers configured in cloud computing platforms.

Description of the Related Art

Organizations are increasingly replying on cloud platforms (or cloud computing platforms) such as AWS (AMAZON WEB SERVICES), GOOGLE cloud platform, MICROSOFT AZURE, and so on for their infrastructure needs. Cloud platforms provide, among other components, servers, storage, databases, networking, software, and so on over the internet to organizations. Conventionally, organizations maintained data centers that house hardware and software used by the organization. However, maintaining data centers can result in significant overhead in terms of maintenance, personnel, and so on. As a result, organizations are shifting their data centers to cloud platforms that provide scalability and elasticity of computing resources.

Organizations maintain cloud infrastructure on cloud platforms using continuous delivery platforms that can manage and deploy applications on cloud platforms. Such continuous delivery platforms allow organizations to simplify software deployment process and manage applications, firewalls, clusters, servers, load balancers, and other computing infrastructure on the cloud platform. However, deploying software releases for services provided on a cloud platform using a continuous delivery platform can be complex. For example, different versions of software may have to be deployed on different services running on different cloud computing resources. Furthermore, each cloud platform uses different tools for managing the resources.

A large system such as a multi-tenant system may manage services for a large number of organizations representing tenants of the multi-tenant system and may interact with multiple cloud platforms. A multi-tenant system may have to maintain several thousand such data centers on a cloud platform. Each datacenter may have different requirements for software releases. Furthermore, the software, languages, features supported by each cloud platform may be different. For example, different cloud platforms may support different mechanism for implementing network policies or access control. As a result, a multi-tenant system has to maintain different implementations of mechanisms for releasing and deploying services on datacenters, depending on the number of cloud platforms that are supported for data centers. This results in high maintenance cost for the multi-tenant system for supporting software releases on data centers across multiple cloud platforms.

Figure 1:
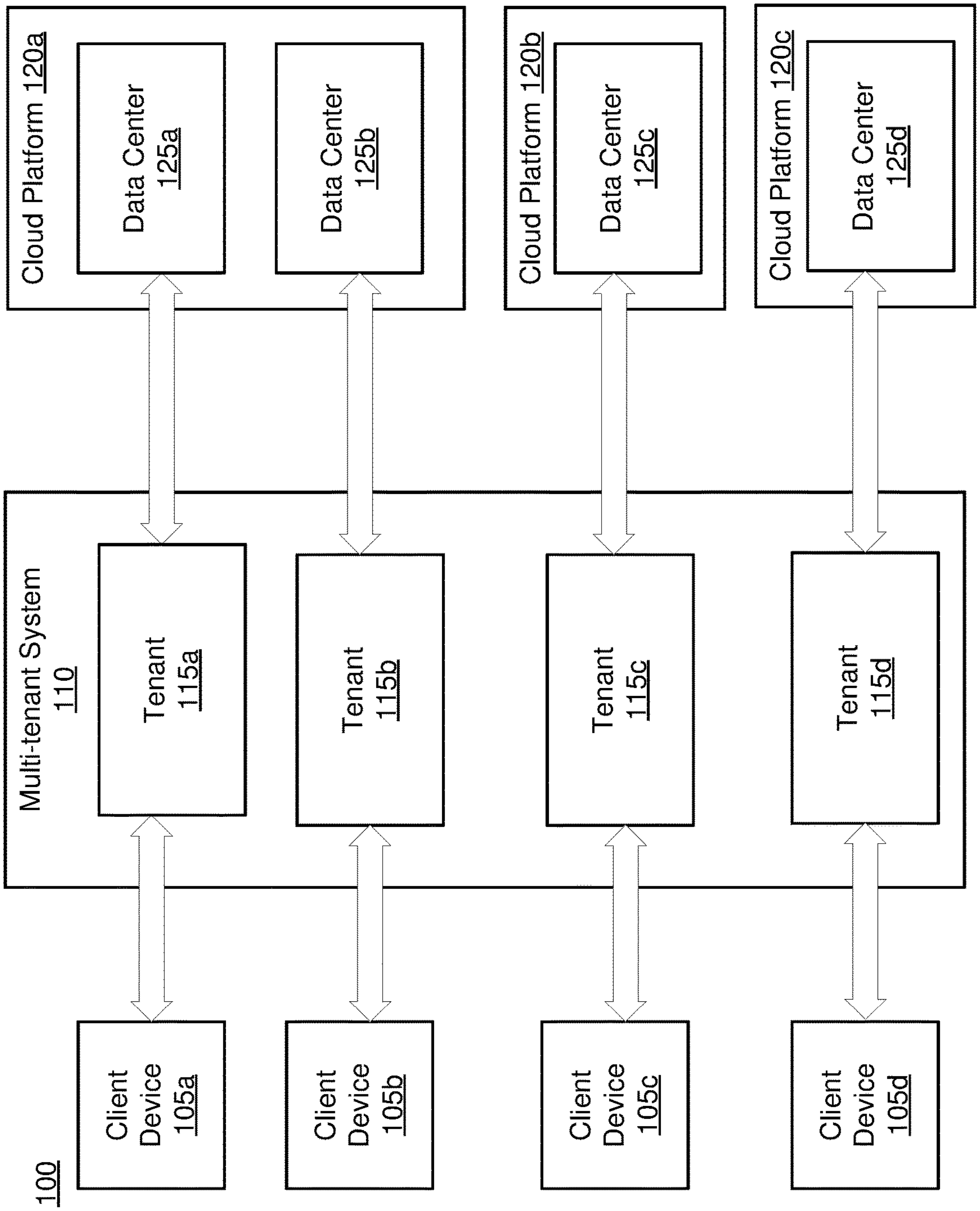
FIG. 1 is a block diagram of a system environment illustrating a multi-tenant system configuring data centers on cloud platforms according to an embodiment.

The figures depict various embodiments for purposes of illustration only. One skilled in the art will readily recognize from the following discussion that alternative embodiments of the structures and methods illustrated herein may be employed without departing from the principles of the embodiments described herein.

The figures use like reference numerals to identify like elements. A letter after a reference numeral, such as "115*a*," indicates that the text refers specifically to the element having that particular reference numeral. A reference numeral in the text without a following letter, such as "115," refers to any or all of the elements in the figures bearing that reference numeral.

DETAILED DESCRIPTION

Cloud platforms provide computing resources, such as storage, computing resources, applications, and so on to computing systems on an on-demand basis via a public network such as internet. Cloud platforms allow enterprises to minimize upfront costs to set up computing infrastructure and also allow enterprises to get applications up and running faster with less maintenance overhead. Cloud platforms also allow enterprises to adjust computing resources to rapidly fluctuating and unpredictable demands. Enterprises can create a data center using a cloud platform for use by users of the enterprise. However, implementing a data center on each cloud platform requires expertise in the technology of the cloud platform.

In one embodiment, the system performs operations related to software releases on datacenters configured on a cloud platform, for example, deploying software releases, provisioning resources, performing rollback of software releases, and so on. The system accesses a data center configured on a target cloud platform. The datacenter is generated based on a cloud platform independent declarative specification comprising a hierarchy of data center entities. Each data center entity comprises one or more of (1) a service or (2) one or more other data center entities.

The system receives a request to build a software artifact for deploying on one or more target datacenter entities of the datacenter configured on the could platform. A software artifact comprises executable instructions associated with a service configured for execution on one or more cloud platforms. The system generates a release configuration that includes reusable release components and is used as a template by the release orchestration system to orchestrate release of the software artifact. In one embodiment, the release configuration includes a variable representing a placeholder for one or more elements of the release. In one embodiment, the release configuration further specifies one or more stagger groups, or a group of target datacenter entities that can be rolled-out in parallel. The release configuration may specify a stagger flow that indicates orchestration of multiple stagger groups to define how the release executes. The release configuration specifies strategies used in the promotions between stagger groups, roll-out and mitigation strategies, notifications, and the like.

The release orchestration system compiles the release configuration file to generate an execution plan for deploying the software artifact in the datacenter. In one embodiment, the execution plan is an immutable artifact that hydrates a release configuration into actual artifact versions and target datacenter entities specified in each stagger group. In one embodiment, the compilation is performed based on information retrieved from the cloud platform specific datacenter representations and an artifact metadata and governance datastore. Thus, in one instance, the compiling replaces the variable with a specific version of the software artifact in the execution plan. The release orchestration system generates a pipeline based on the execution plan, and executes the pipeline to perform a release of the software artifact on the target datacenter entities.

A cloud platform is also referred to herein as a substrate. The declarative specification of data center is substrate independent or substrate agnostic. If operations related to a datacenter such as deployment of software releases, provisioning of resources, and so on are performed using conventional techniques, the user has to provide cloud platform specific instructions. Accordingly, the user needs expertise of the cloud platform being used. Furthermore, the instructions are cloud platform specific and are not portable across multiple platforms. For example, the instructions for deploying software on an AWS cloud platform are different from instructions on a GCP cloud platform. A developer needs to understand the details of how each feature is implemented on that specific cloud platform. The system disclosed provides a cloud platform infrastructure language that allows users to perform operations on datacenters using instructions that are cloud platform independent and can be executed on any cloud platform selected from a plurality of cloud platforms. A compiler of the cloud platform infrastructure language generates a cloud platform specific detailed instructions for a target cloud platform.

The cloud platform infrastructure language may be referred to as a domain specific language (DSL). The system may represent a multi-tenant system but is not limited to multi-tenant systems and can be any online system or any computing system with network access to the cloud platform.

System Environment

FIG. 1 is a block diagram of a system environment illustrating a multi-tenant system configuring data centers on cloud platforms according to an embodiment. The system environment 100 comprises a multi-tenant system 110, one or more cloud platforms 120, and one or more client devices 105. In other embodiments, the system environment 100 may include more or fewer components.

The multi-tenant system 110 stores information of one or more tenants 115. Each tenant may be associated with an enterprise that represents a customer of the multi-tenant system 110. Each tenant may have multiple users that interact with the multi-tenant system via client devices 105.

A cloud platform may also be referred to as a cloud computing platform or a public cloud environment. A tenant may use the cloud platform infrastructure language to provide a declarative specification of a datacenter that is created on a target cloud platform 120 and to perform operations using the datacenter, for example, provision resources, perform software releases and so on. A tenant 115 may create one or more data centers on a cloud platform 120. A data center represents a set of computing resources including servers, applications, storage, memory, and so on that can be used by users, for example, users associated with the tenant. Each tenant may offer different functionality to users of the tenant. Accordingly, each tenant may execute different services on the datacenter configured for the tenant. The multi-tenant system may implement different mechanisms for release and deployment of software for each tenant. A tenant may further obtain or develop versions of software that include instructions for various services executing in a datacenter. Embodiments allow the tenant to deploy specific versions of software releases for different services running on different computing resources of the datacenter.

The computing resources of a data center are secure and may not be accessed by users that are not authorized to access them. For example, a data center **125*a* that is created for users of tenant 115*a* may not be accessed by users of tenant 115*b* unless access is explicitly granted. Similarly, data center 125*b* that is created for users of tenant 115*b* may not be accessed by users of tenant 115*a*, unless access is explicitly granted. Similarly, data center 125*c* that is created for users of tenant 115*c* may not be accessed by users of tenant 115*d*, unless access is explicitly granted. Similarly, data center 125*d* that is created for users of tenant 115*d* may not be accessed by users of tenant 115*c***, unless access is explicitly granted. Furthermore, services provided by a data center may be accessed by computing systems outside the data center, only if access is granted to the computing systems in accordance with the declarative specification of the data center.

With the multi-tenant system 110, data for multiple tenants may be stored in the same physical database. However, the database is configured so that data of one tenant is kept logically separate from that of other tenants so that one tenant does not have access to another tenant's data, unless such data is expressly shared. It is transparent to tenants that their data may be stored in a table that is shared with data of other customers. A database table may store rows for a plurality of tenants. Accordingly, in a multi-tenant system, various elements of hardware and software of the system may be shared by one or more tenants. For example, the multi-tenant system 110 may execute an application server that simultaneously processes requests for a number of tenants. However, the multi-tenant system enforces tenant-level data isolation to ensure that jobs of one tenant do not access data of other tenants.

Examples of cloud platforms include AWS (AMAZON web services), GOOGLE cloud platform, or MICROSOFT AZURE. A cloud platform 120 offers computing infrastructure services that may be used on demand by a tenant 115 or by any computing system external to the cloud platform 120. Examples of the computing infrastructure services offered by a cloud platform include servers, storage, databases, networking, security, load balancing, software, analytics, intelligence, and other infrastructure service functionalities.

These infrastructure services may be used by a tenant 115 to build, deploy, and manage applications in a scalable and secure manner.

The multi-tenant system 110 may include a tenant data store that stores data for various tenants of the multi-tenant store. The tenant data store may store data for different tenants in separate physical structures, for example, separate database tables or separate databases. Alternatively, the tenant data store may store data of multiple tenants in a shared structure. For example, user accounts for all tenants may share the same database table. However, the multi-tenant system stores additional information to logically separate data of different tenants.

Each component shown in FIG. 1 represents one or more computing devices. A computing device can be a conventional computer system executing, for example, a Microsoft™ Windows™-compatible operating system (OS), Apple™ OS X, and/or a Linux distribution. A computing device can also be a client device having computer functionality, such as a personal digital assistant (PDA), mobile telephone, video game system, etc. Each computing device stores software modules storing instructions.

The interactions between the various components of the system environment 100 are typically performed via a network, not shown in FIG. 1. In one embodiment, the network uses standard communications technologies and/or protocols. In another embodiment, the entities can use custom and/or dedicated data communications technologies instead of, or in addition to, the ones described above.

Although the techniques disclosed herein are described in the context of a multi-tenant system, the techniques can be implemented using other systems that may not be multi-tenant systems. For example, an online system used by a single organization or enterprise may use the techniques disclosed herein to create one or more data centers on one or more cloud platforms 120.

System Architecture of Multi-Tenant System

Figure 2:
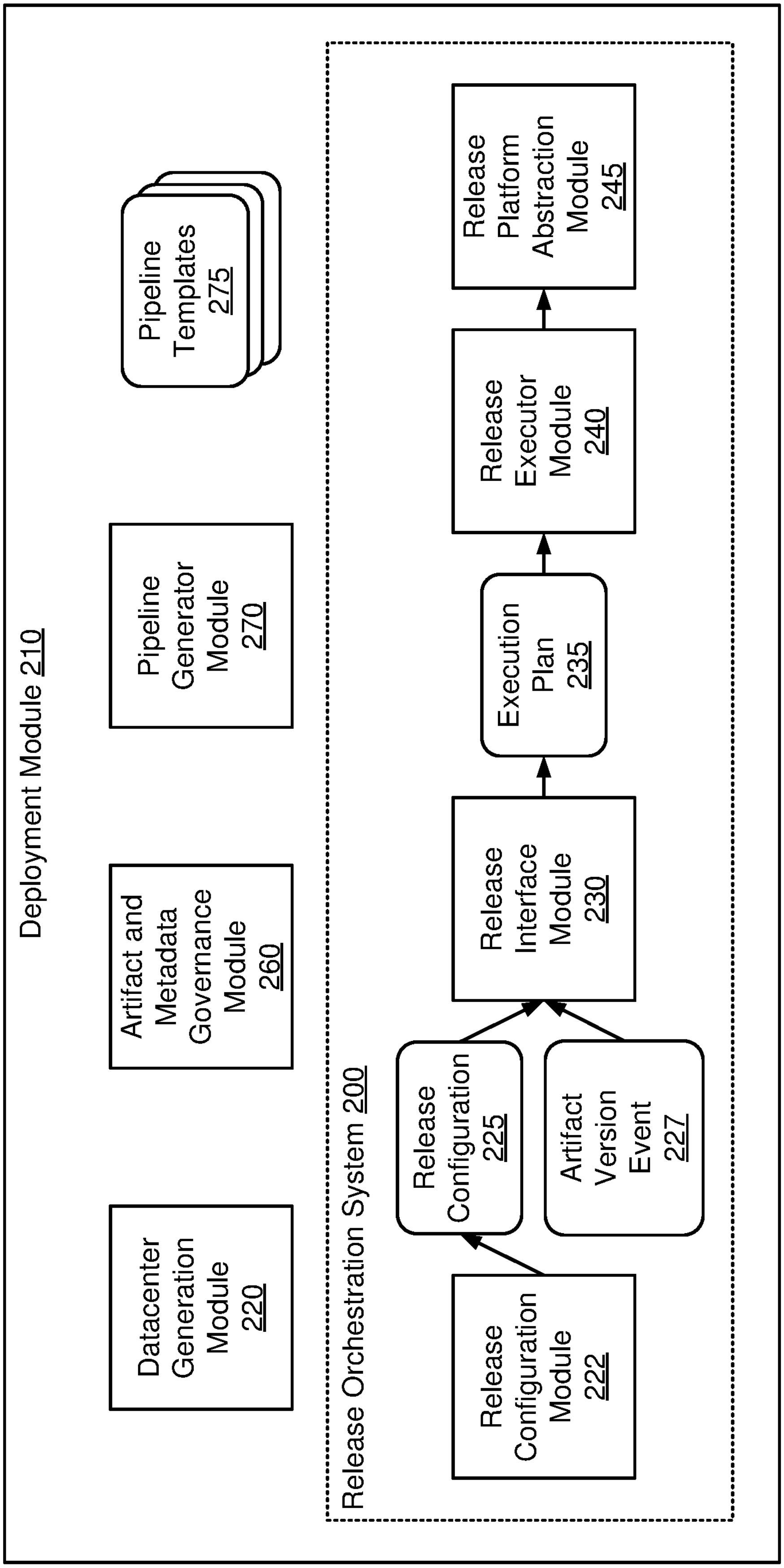
FIG. 2 is a block diagram illustrating the system architecture of a deployment module 210 according to an embodiment.

The multi-tenant system 110 includes a deployment module for deploying software artifacts on the cloud platforms. The deployment module can perform various operations associated with software releases, for example, provisioning resources on a cloud platform, deploying software releases, performing rollbacks of software artifacts installed on datacenter entities, and so on. FIG. 2 is a block diagram illustrating the system architecture of a deployment module 210 according to an embodiment. The deployment module 210 includes a data center generation module 220, an artifact and metadata governance module 260, a release configuration module 222, a pipeline generator module 270, and a release orchestration system 200. The release orchestration system 200 further includes a release interface module 230, a release executor module 240, and a release platform abstraction module 245. Other embodiments can have different and/or other components than the ones described here, and that the functionalities can be distributed among the components in a different manner.

Figure 4:
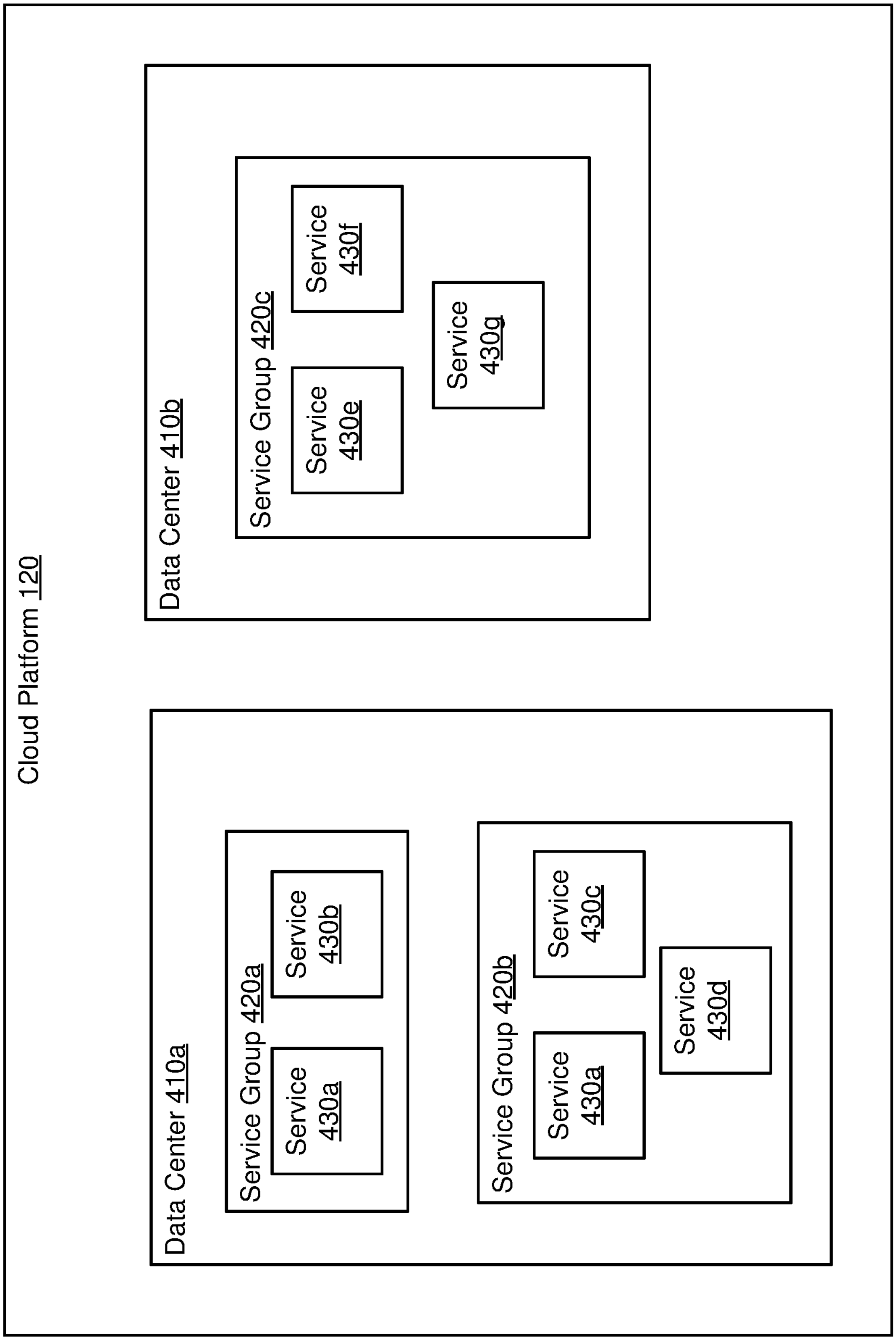
FIG. 4 illustrates example data centers created on a cloud platform based on a declarative specification according to one embodiment.

The data center generation module 220 includes instructions for creating datacenters on the cloud platform. The data center generation module 220 receives from users, for example, users of a tenant, a cloud platform independent declarative specification of a data center. The cloud platform independent declarative specification of a data center specifies various entities of the data center. In an embodiment, the cloud platform independent declarative specification of a data center comprises a hierarchical organization of datacenter entities, where each datacenter entity may comprise one or more services, one or more other datacenter entities or a combination of both. FIG. 4 describes various types of datacenter entities in further detail. The data center generation module 220 receives the platform independent declarative specification and a target cloud platform as input and generates a cloud platform specific metadata representation for the target cloud platform. The data center generation module 220 deploys the generated cloud platform specific metadata representation on the target cloud platform to create a data center on the target cloud platform according to the declarative specification.

The artifact and metadata governance (AMG) module 260 stores and manages versions of software artifacts. A software artifact comprises executable instructions associated with a service configured for execution on one or more cloud platforms. Specifically, when a trigger event occurs, such as when a new version of a software artifact is built and registered to the AMG module 260, the AMG module 260 generates a version set event 227 to the release orchestration system 200 that signals that a trigger event has occurred (e.g., new version of a software artifact registered) and the event invokes the release of the software artifact.

The pipeline generator module 270 receives pipeline templates 275 and generates materialized pipelines for execution by a release platform (e.g., Spinnaker) for target datacenter entities of a release. Specifically, a user of the multi-tenant system 110 generates and configures pipeline templates 275 for target datacenter entities (e.g., service instances). The pipeline templates 275 are registered in conjunction with the declarative specifications for these datacenter entities. Therefore, a datacenter entity, such as a service, may be associated with one or more pipeline templates 275. A pipeline template 275 includes variables and is converted or "hydrated" into a pipeline by providing specific values of the variables in the pipeline template. A pipeline template 275 includes templating expressions used as placeholders for actual values in the deployment. For example, a templating expression may be replaced by target specific parameter values or expressions. Multiple pipeline instances may be generated by hydrating the pipeline template 275 for different targets.

A pipeline when executed may comprise a sequence of stages, each stage representing one or more actions that need to be performed by the target cloud platform towards provisioning and deploying of the datacenter. The stages may include, for example, deployment of services, destroying services, provisioning resources for services, destroying resources for services, and so on.

The release orchestration system 200 orchestrates release of software artifacts on one or more target datacenter entities of the datacenters configured on the cloud platform. The release configuration module 222 generates one or more release configurations 225 for deploying one or more software artifacts to target datacenter entities of the cloud platform. The release configuration system 222 receives configuration information from users of the multi-tenant system 110 that specify one or more configurations for the release. In one instance, the configuration information specifies one or more variables representing a placeholder for a set of elements of the release. In one instance, the one or more variables represent a placeholder for a version of the software artifact to be deployed on the one or more target datacenter entities. In one instance, the one or more variables represent a placeholder for a version of the pipeline template for use during deployment. In one instance, the one or more variables represent selectors for each of a set of stagger groups, in which a stagger group specifies a subset of target datacenter entities for which a release can be executed in parallel.

In one embodiment, when the configuration information specifies stagger groups, the configuration information further specifies filtering criteria for one or more stagger groups. As described above, a stagger group is a group of target datacenter entities for which the software artifact can be rolled-out in parallel. The configuration information may include a stagger flow that indicates orchestration of the release across multiple stagger groups to define how the release executes. In another instance, the configuration information specifies one or more promotion criteria that specifies when the release can be promoted from target datacenter entities of one stagger group to target datacenter entities of the next stagger group.

The release configuration system 222 generates a release configuration 225 for a software artifact associated with one or more services based on the pipeline templates 275 for the services. The release configuration 225 includes reusable release components and is used as a template by the release orchestration system 200 to orchestrate release of the software artifact. In one embodiment, the release configuration 225 is generated with the configuration information, including a variable (e.g., "latest version," "stable version") representing a placeholder for a version of the software artifact to be deployed on the one or more target datacenter entities, the presence and filtering criteria of one or more stagger groups, a stagger flow, promotion criteria between stagger groups, and other types of strategies for release orchestration, and the like.

The release interface module 230 receives a version set event 227 that signals that a trigger event has occurred for one or more software artifacts from the AMG module 260. The release interface module 230 retrieves release configurations 225 that match these software artifacts in the version set event. The release interface module 230 compiles the release configuration 225 to generate an execution plan 235 for deploying the software artifact in the target datacenter entities. In one embodiment, the execution plan 235 is an immutable artifact generated by hydrating a release configuration 225 into actual values for the variables (e.g., actual artifact versions or pipeline versions) and the target datacenter entities specified in each stagger group.

In one embodiment, the compilation by the release interface module 230 is performed based on information retrieved from the cloud platform specific datacenter representations and data stored in the artifact and metadata governance module 260. In one instance, the compiling by the release interface module 230 replaces a variable representing a placeholder for a version of the software artifact with a specific version of the software artifact in the execution plan. In one instance, the compiling by the release interface module 230 resolves one or more selectors representing placeholders for target datacenter entities for each stagger group with actual instances (e.g., actual instances of a service) based on the declarative specifications of the cloud platform.

Thus, depending on the release configuration information, the execution plan 235 may specify that the release of a software artifact occur according to a stagger flow that specifies the sequence of stagger groups for release. For example, the execution plan 235 may specify that the release for a service instance start from service instances in a development canary stagger group, then responsive to meeting a promotion decision, a development blast stagger group, then responsive to meeting a promotion decision, a test canary stagger group, then responsive to meeting a promotion decision, a test blast stagger group. As another example, the execution plan 235 may further specify within a stagger group, one or more services the release should be orchestrated across.

The release executor module 240 receives an execution plan 235 and orchestrates release of the software artifact to execute pipelines for the software artifact on target datacenter entities according to the execution plan 235. In one instance, the release executor module 240 is configured as a multi-step workflow composed of one or more step functions. In one instance, each step function in the workflow corresponds to a service instance of a stagger group, and the step functions of the workflow may correspond to release of the software artifact according to the stagger flow specified in the release configuration 225.

In one embodiment, the release executor module 240 has access to information on one or more instances and shards of a release platform (e.g., Spinnaker) for executing the pipelines for the release. Specifically, one or more instances of a release platform may be instantiated for executing pipelines for releasing and deploying software on target datacenter entities. In one instance, there may be an instance of the release platform dedicated to executing pipelines on target datacenter entities of a particular environment type (e.g., pre-production environments, production environments). In one instance, an instance of the release platform may be further sharded according to services within the datacenter entities of the particular environment. Thus, a particular shard of the release platform is dedicated to executing pipelines for one or more service instances. The release executor module 240 has access to the mappings between release platform instances and shards and the particular datacenter entities each instance or shard is configured to execute pipelines for.

For each step in the workflow, the release executor module 240 determines one or more shards of the release platform for executing the pipelines for the step function (e.g., service instance in datacenter entity in first stagger group). The step function provides an event to the release platform abstraction module 245 requesting execution of a pipeline by the identified shards of the release platform. The event by the release executor module 240 may also trigger the pipeline generator module 270 to generate a materialized pipeline for the target datacenter entity (e.g., service instance) of the stagger group. The release executor module 240 may receive an event from the release platform abstraction module 245 on whether the execution of the pipeline has been completed or whether there were errors in the execution. Responsive to completion, the release executor module 240 may repeat this process for remaining step functions in the workflow.

The release platform abstraction module 245 receives events from the release executor module 240 to trigger execution of pipelines on target datacenter entities for release and deployment of software. The event from a step function of the release executor module 240 specifies information on the execution such as the pipeline version, the software artifact version, and the identified shard of the release platform for executing the pipeline. The release platform abstraction module 245 provides the appropriate release platform instance or shard with this information through an interface (e.g., API) of the release platform, such that the identified shard can execute the pipeline on the target datacenter entities. The release platform abstraction module 245 may receive notifications from the interface of the release platform on whether the pipeline execution has been completed or whether there were any errors in the execution, and relay the notification to the release executor module 240.

Cloud Platform-Based Data Center Generation

Figure 3:
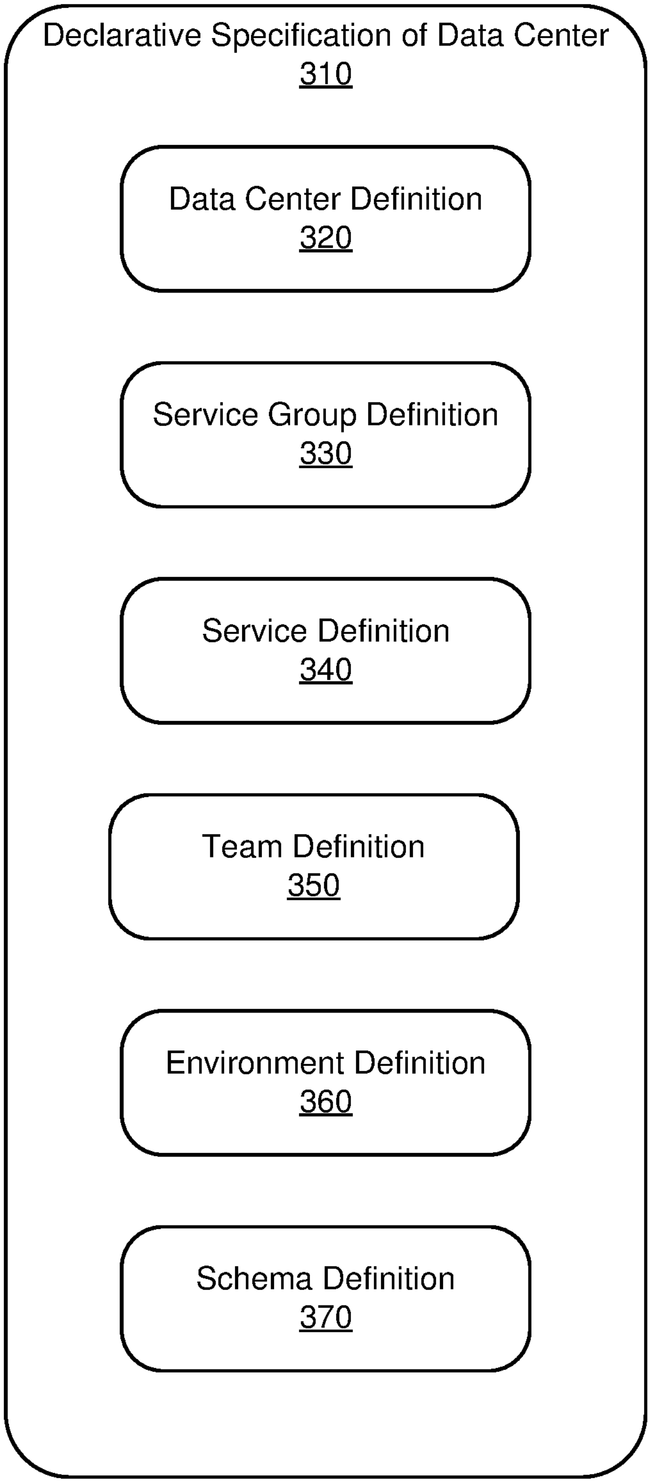
FIG. 3 illustrates an example of a data center declarative specification according to one embodiment.

FIG. 3 illustrates an example of a declarative specification of a data center according to one embodiment. The declarative specification 310 includes multiple data center entities. A data center entity is an instance of a data center entity type and there can be multiple instances of each data center entity type. Examples of data center entities include data centers, service groups, services, teams, environments, and schemas.

The declarative specification 310 includes definitions of various types of data center entities including service group, service, team, environment, and schema. The declarative specification 310 includes one or more instances of data centers. Following is a description of various types of data center entities and their examples. The examples are illustrative and show some of the attributes of the data center entities. Other embodiments may include different attributes and an attribute with the same functionality may be given a different name than that indicated herein. In an embodiment, the declarative specification is specified using hierarchical objects, for example, JSON (Javascript object notation) that conform to a predefined schema.

A service group 330 represents a set of capabilities and features and services offered by one or more computing systems that can be built and delivered independently, in accordance with one embodiment. A service group may be also referred to as a logical service group, a functional unit, or a bounded context. A service group 330 may also be viewed a set of services of a set of cohesive technical use-case functionalities offered by one or more computing systems. A service group 330 enforces security boundaries. A service group 330 defines a scope for modifications. Thus, any modifications to an entity, such as a capability, feature, or service offered by one or more computing systems within a service group 330 may propagate as needed or suitable to entities within the service group, but does not propagate to an entity residing outside the bounded definition of the service group 330. A data center may include multiple service groups 330. A service group definition specifies attributes including a name, description, an identifier, schema version, and a set of service instances. An example of a service group is a blockchain service group that includes a set of services used to providing blockchain functionality. Similarly, a security service group provides security features. A user interface service group provides functionality of specific user interface features. A shared document service group provides functionality of sharing documents across users. Similarly, there can be several other service groups.

Service groups support reusability of specification so that tenants or users interested in developing a data center have a library of service groups that they can readily use. The boundaries around services of a service groups are based on security concerns and network concerns among others. A service group is associated with protocols for performing interactions with the service group. In an embodiment, a service group provides a collection of APIs (application programming interfaces) and services that implement those APIs. Furthermore, service groups are substrate independent. A service group provides a blast radius scope for the services within the service group so that any failure of a service within the service group has impact limited to services within the service group and has minimal impact outside the service group.

Following is an example of a specification of a service group. The service group specifies various attributes representing metadata of the service group and includes a set of services within the service group. There may be other types of metadata specified for a service group, not indicated herein.

```
{
  "service_group": [
    {
      "cells": [ ],
      "description": "Service group Service Instance Definitions",
      "service_group_id": "id1",
      "name": "name1",
      "schema_version": "1.0",
        "cluster_instances": [
              {
                  "cluster_instance_name": "cluster1",
                   "cluster_type": "cluster_type1"
              },
              {
                     "cluster_instance_name": " cluster2",
                     "cluster_type": " cluster_type1"
              },
              {
                     "cluster_instance_name": " cluster3",
                     "cluster_type": " cluster_type2"
              }
          ],
      "service_instances": [
              {
                 "service_instance_name": "serviceinstance0001",
                 "service_type": "servicetype1"
              },
          {
                 "service_instance_name": "serviceinstance0002",
                 "service_type": " servicetype1"
              "cluster_instance": "cluster1"
        },
        {
```

-continued

```
                "service__instance__name": "serviceinstance0003",
                "service__type": " servicetype2"
            },
            ...
        ],
    "service__teams": ["team1"],
      "type": "servicetype"
        "security__groups":[
            {
                "name":"group1",
                "policies":[
                    {
                      "description":"Allow access from site S1",
                      "destination":{ "groups":[ "group2" ] },
                      "environments":[ "dev", "test", "staging" ],
                      "source":{
                        "iplist":"URL1",
                        "filters":[ filter-expression" ]
                    }
                  ]
              }
        ]
    }
  ]
}
```

As shown in the example above, a service group may specify a set of clusters. A cluster represents a set of computing nodes, for example, a set of servers, a set of virtual machines, or a set of containers (such as KUBERNETES containers). A physical server may run multiple containers, where each container has its own share of filesystem, CPU, memory, process space, and so on.

The service group specifies a set of services. A service group may specify a cluster for a service so that the data center deployed on a cloud platform runs clusters of computing nodes and maps the services to clusters based on the specified mapping if included in the declarative specification. For example, in the service group example shown above, the service instance serviceinstance0002 is specified to run on cluster instance cluster1.

The service group may specify security groups, each security group specifying a set of services that are allowed to interact with each other. Services outside the security group are required to pass additional authentication to communicate with services within the security group. Alternatively, the services within a security group use one protocol to interact with each other and services outside the security group use a different protocol that requires enhances authentication to interact with services within the security group. Accordingly, a security group specifies policies that determine how services can interact with each other. A security policy may specify one or more environments for which the security policy is applicable. For example, a security policy policy 1 may apply to a particular environment env1 (e.g., production environment) and another security policy policy2 may apply to another environment env2 (e.g., development environment). A security policy may be specified for a service group type or for a specific service type.

In an embodiment, the security policy specifies expressions for filtering the service groups based on various attributes so that the security policy is applicable to the filtered set of service groups. For example, the security policy may specify a list of IP (internet protocol) addresses that are white listed for a set of service groups identified by the filtered set and accordingly these computing systems are allowed access to the service group or to specific set of services within the service group.

In an embodiment, a security policy may specify for a service group, a set of source services and a set of destination services. The source services for a particular service specify the services outside the security group that are allowed to connect with this particular service. The destination services for a particular service specify the services outside the security group that this particular service needs to connect to. During provisioning and deployment, the data center generation module 220 generates instructions for the cloud platform that implement specific network policies using cloud platform specific features and network functionality such that the network policies implement the security policies specified in the declarative specification 310.

A data center entity called a cell represents a set of services that interact with each other in a vertical fashion and can be scaled by additional instances or copies of the cell, i.e., copies of the set of services. Creating multiple instances of a cell allows a system to scale a set of services that interact with each other. A data center instance may include one or more cells. Each cell may include one or more services. A data center may include instances of service groups or cells.

A service definition 340 specifies metadata for a type of service, for example, database service, load balancer service, and so on. The metadata describes various attributes of a service including a name of the service, description of the service, location of documentation for the service, any sub-services associated with the service, an owner for the service, a team associated with the service, build dependencies for the service specifying other services on which this service depends at build time, start dependencies of the service specifying the other services that should be running when this particular service is started, authorized clients, domain name server (DNS) name associated with the service, a service status, a support level for the service, and so on. The service definition 340 specifies a listening ports attribute specifying the ports that the service can listen on for different communication protocols, for example, the service may listen on a port p1 for UDP protocol and a port p2 for TCP protocol. Other services within the data center can interact with a service via the ports specified by the service.

The service definition 340 specifies an attribute outbound access that specifies destination endpoints, for example, external URLs (uniform resource locators) specifying that the service needs access to the specified external URLs. During deployment, the data center generation module 220 ensures that the cloud platform implements access policies such that instances of this service type are provided with the requested access to the external URLs.

The outbound access specification may identify one or more environment types for the service for which the outbound access is applicable. For example, an outbound access for a set of endpoints S1 may apply to a particular environment env1 (e.g., production environment) and outbound access for a set of endpoints S2 may apply to another environment env2 (e.g., development environment).

Following is an example of a service definition 340.

```
{
  "service_definition": [
    {
        "authorized_clients": [ ],
        "build_dependencies": [ ],
        "description": "description of service",
        "dns_name": "dns1",
        "documentation": "URL",
        "name": "name1",
        "namespace": "space1",
        "service_owner": "user1",
        "service_status": "GA",
        "service_team": "team1",
        "support_level": "STANDARD",
        "start_dependencies": ["svc5", "svc7", ...],
        "sub_services": [ "service1", " service2", " service3",
...         ],
          "listening_ports":[
                { "protocol":"tcp", "ports":[ "53" ] },
                { "protocol":"udp", "ports":[ "53" ] }
            "outbound_access":[
                  {
                     "destination":[
                          {
                              "endpoints":[ ".xyz.com:443",
".pqr.com:443" ]
                          }
                      ]
                  }
            ]
```

A team definition 350 includes team member names and other attributes of a team for example, name, email, communication channel and so on. Following is an example of a team definition 350. A service may be associated with one or more teams that are responsible to modifications made to that service. Accordingly, any modification made to that service is approved by the team. A service may be associated with a team responsible for maintenance of the service after it is deployed in a cloud platform. A team may be associated with a service group and is correspondingly associated with all services of that service group. For example, the team approves any changes to the service group, for example, services that are part of the service group. A team may be associated with a data center and is accordingly associated with all service groups within the data center. A team association specified at a data center level provides a default team for all the service groups within the data center and further provides a default team for all services within the service groups.

According to an embodiment, a team association specified at the functional level overrides the team association provided at the data center level. Similarly, a team association specified at the service level overrides the default that may have been provided by a team association specified at the service group level or a data center level. A team can decide how certain action is taken for the data center entity associated with the team. The team associations also determine the number of accounts on the cloud platform that are created for generating the final metadata representation of the data center for a cloud platform by the compiler and for provisioning and deploying the data center on a cloud platform. The data center generation module 220 creates one or more user accounts in the cloud platform and provides access to the team members to the user accounts. Accordingly, the team members are allowed to perform specific actions associated with the data center entity associated with the team, for example, making or approving structural changes to the data center entity or maintenance of the data center entity when it is deployed including debugging and testing issues that may be identified for the data center entity.

Conventional techniques associate the same team with the data center throughout the design process thereby resulting in the organizational structure having an impact on the design of the data center or service group. Embodiments decouple the team definition from the constructions that define the data center entity, thereby reducing the impact of the teams on the design and architecture of the data center entity.

```
{
  "team_definition": [
    {
      "name": "team1",
      "description": "description of team",
      "admins": [
        "user1",
        "user2",
        "user3",
        "user4",
        ...
      ],
      "team_id": "id1",
      "owner": "owner_id",
      "email": "team1@xyz.com"
    }
  ],
  "communication_channel": "channel1"
  "schema_version": "1.0"
}
```

An environment definition 360 specifies a type of system environment represented by the data center, for example, development environment, staging environment, test environment, or production environment. A schema definition 370 specifies schema that specifies syntax of specific data center entity definitions. The schema definition 370 is used for validating various data center entity definitions. The data center generation module 220 determines security policies for the data center in the cloud platform specific metadata representation based on the environment. For example, a particular set of security policies may be applicable for an environment env1 and a different set of security policies may be applicable for environment env2. For example, the security policies provide much more restricted access in production environment as compared to development environment. The security policy may specify the length of time that a security token is allowed to exist for specific purposes. For example, long access tokens (e.g., week long access tokens) may be allowed in development environment but access tokens with much smaller life time (e.g., few hours) used in production environment. Access tokens may allow users or services with access to specific cloud platform resources.

A data center definition 320 specifies the attributes and components of a data center instance. A declarative specification may specify multiple data center instances. The data center definition 320 specifies attributes including a name, description, a type of environment, a set of service groups, teams, domain name servers for the data center, and so on. A data center definition 320 may specify a schema definition and any metadata representation generated from the data center definition is validated against the specified schema definition. A data center includes a set of core services and capabilities that enable other services to function within the data center. An instance of a data center is deployed in a particular cloud platform and may be associated with a particular environment type, for example, development, testing, staging, production, and so on.

Following is a definition of a data center instance. The data center instance definition 320 includes a list of service groups included in the data center instance and other attributes including an environment of the data center, a data center identifier, a name, a region representing a geographical region, one or more teams associated with the data center, and a schema version.

```
{
  "datacenter_instance": {
      "environment": "env1",
        "datacenter_instance_identifier": "id1",
          "name": "data_center1",
          "region": "region1",
          "service_groups": [
              "service_group1",
              " service_group2",
              " service_group3",
            “service_group4”,
              ...
          ],
      "schema_version": "1.0",
      "admin_team":"admins",
        ...
      }
    }
  }
}
```

FIG. 4 illustrates some example data centers created on a cloud platform based on a declarative specification according to one embodiment. The data centers 410 may be created based on a declarative specification processed by the data center generation module 220. As shown in FIG. 4, multiple data centers may be configured within a cloud platform 120. Each data center 410 may correspond to a tenant 115 of a multi-tenant system 110. A tenant 115 may create one or more data centers 410. Alternatively, a data center 410 may be created by any computing system. Each data center includes one or more service groups. For example, data center 410*a* includes service groups 420*a* and 420*b* and data center 410*b* includes service group 420*c*. A data center may include multiple instances of a particular type of service group. Each service group includes a set of services. For example, service group 420*a* includes services 430*a* and 430*b*, service group 420*b* includes services 430*a*, 430*c*, and 430*d*, and service group 420*c* includes services 430*e*, 430*f*, and 430*g*. A service group may include multiple instances of services of the same service type.

The datacenter generation module 220 creates data centers on cloud platforms based on a declarative specification using the following steps. The data center generation module 220 receives a cloud platform independent declarative specification of a data center. The cloud platform independent declarative specification may be for a tenant of the multi-tenant system or for any other computing system, for example, an online system. The cloud platform independent declarative specification is specified using the cloud platform infrastructure language. The cloud platform independent declarative specification of the data center is configured to generate the data center on any of a plurality of cloud platforms.

The data center generation module 220 receives information identifying a target cloud platform for creating the data center based on the cloud platform independent declarative specification. The target cloud platform could be any of a plurality of cloud platforms, for example, AWS, AZURE, GCP, and so on. The data center generation module 220 further receives information to connect with the target cloud platform, for example, credentials for creating a connection with the target cloud platform. A cloud platform may also be referred to as a cloud computing platform.

The data center generation module 220 compiles the cloud platform independent declarative specification to generate a cloud platform specific data center representation for creating the data center on the target cloud computing platform. For example, the cloud platform specific data center representation may refer to user accounts, network addresses, and so on that are specific to the target cloud computing platform.

The data center generation module 220 sends the platform specific data center representation along with instructions for deploying the data center on the target cloud computing platform. The target cloud computing platform executes the instructions to configure the computing resources of the target cloud computing platform to generate the data center according to the platform specific data center representation. The data center generation module 220 provides users with access to the computing resources of the data center configured by the cloud computing platform. For example, if the data center was created for a tenant of the multi-tenant system, users associated with the tenant are provided with access to the data center.

Figure 5:
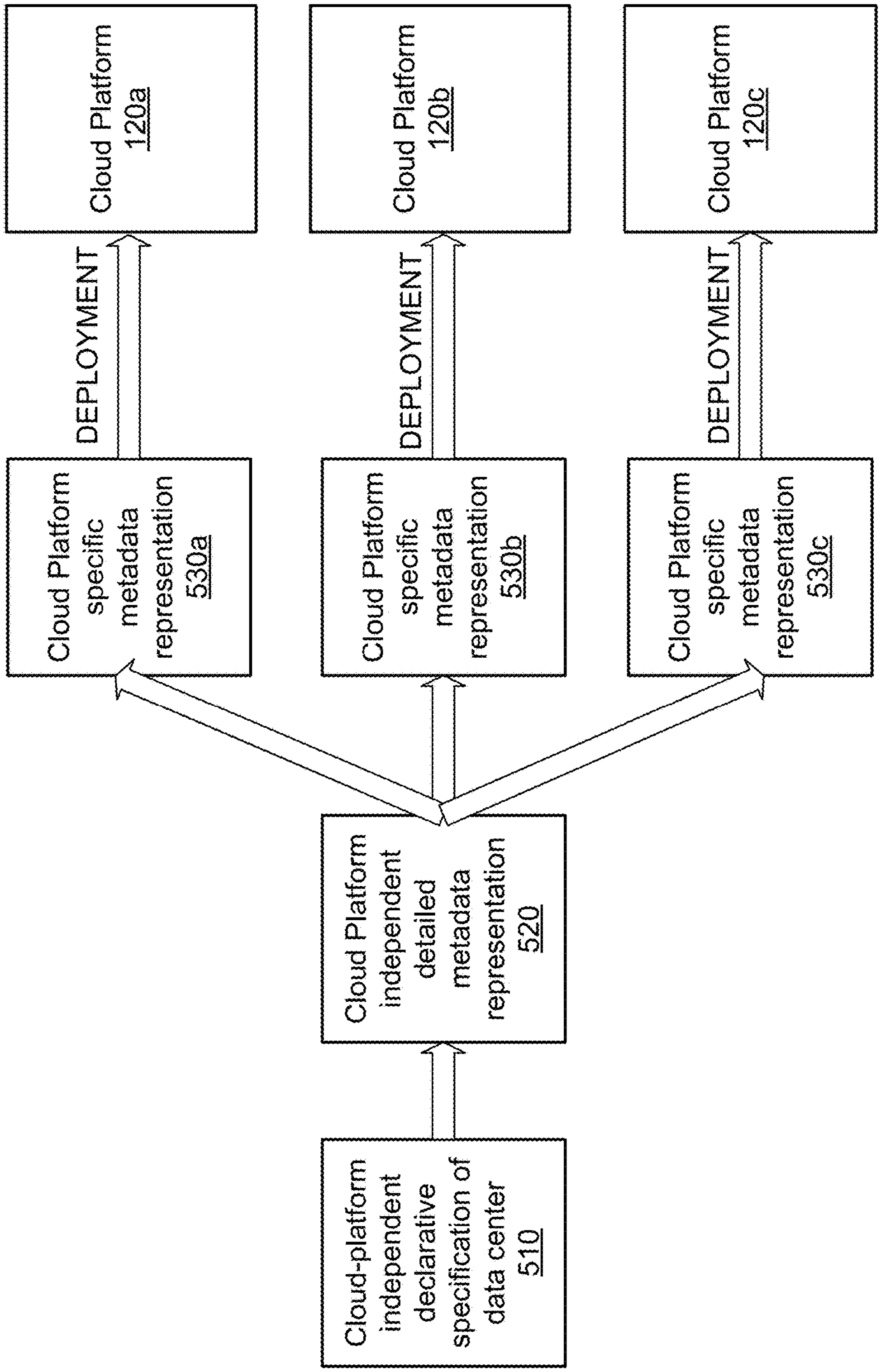
FIG. 5 is a block diagram illustrating generation of data centers on cloud platforms based on a declarative specification, according to one embodiment.

FIG. 5 is a block diagram illustrating generation of data centers on cloud platforms based on a declarative specification, according to one embodiment. The datacenter generation module 220 receives as input a cloud-platform independent declarative specification 510. The cloud-platform independent declarative specification 510 may be a version of the declarative specification that is being incrementally modified by users. The datacenter generation module 220 processes a particular version of the cloud-platform independent declarative specification 510. Since cloud-platform independent declarative specification 510 is not specified for any specific target cloud platform, the datacenter generation module 220 can configure a data center on any target cloud platform based on the cloud-platform independent declarative specification 510.

The datacenter generation module 220 processes the cloud-platform independent declarative specification 510 to generate a cloud-platform independent detailed metadata representation 520 for the data center. The cloud-platform independent detailed metadata representation 520 defines details of each instance of data center entity specified in the cloud-platform independent declarative specification 510. The datacenter generation module 220 creates unique identifiers for data center entity instances, for example, service instances.

In an embodiment, the cloud-platform independent detailed metadata representation 520 includes an array of instances of data center entity types, for example, an array of service group instances of a particular service group type. Each service group instance includes an array of service instances. A service instance may further include the details of a team of users that are allowed to perform certain actions associated with the service instance. The details of the team are used during provisioning and deployment by the datacenter generation module 220, for example, for creating a user account for the service instance and allowing members of the team to access the user account.

The cloud-platform independent detailed metadata representation 520 includes attributes of each instance of data center entity. Accordingly, the description of each instance of data center entity is expanded to include all details. As a result, the cloud-platform independent detailed metadata representation 520 of a data center may be significantly larger than the cloud-platform independent declarative specification 510. For example, the cloud-platform independent declarative specification 510 may be few thousand lines of specification, whereas the cloud-platform independent detailed data center representation 520 may be millions of lines of generated code. As a result, the datacenter generation module 220 keeps the cloud-platform independent detailed metadata representation 520 as immutable, i.e., once the representation is finalized, no modifications are performed to the representation. For example, if any updates, deletes, or additions of data center entities need to be performed, they are performed on the cloud platform independent declarative specification 510.

The datacenter generation module 220 receives a target cloud platform on which the data center is expected to be provisioned and deployed and generates a cloud platform specific detailed metadata representation 530 of the data center. For example, the datacenter generation module 220 interacts with the target cloud platform to generate certain entities (or resources), for example, user accounts, virtual private clouds (VPCs), and networking resources such as subnets on the VPCs, various connections between entities in the cloud platform, and so on. The datacenter generation module 220 receives resource identifiers of resources that are created in the target cloud platform, for example, user account names, VPC IDs, and so on, and incorporates these in the cloud-platform independent detailed metadata representation 520 to obtain the cloud platform specific metadata representation 530 of the data center. In an embodiment, the datacenter generation module 220 creates one unique user account on the cloud platform for each team for a given combination of a service group and a service. The user account is used by the team for performing interactions with that particular service for that service group, for example, for debugging, for receiving alerts, and so on.

The target cloud platform may perform several steps to process the cloud-platform specific detailed metadata representation 530. For example, the cloud platform independent declarative specification may specify permitted interactions between services. These permitted interactions are specified in the cloud-platform specific detailed metadata representation 530 and implemented as network policies of the cloud platform. The cloud platform may further create security groups to implement network strategies to implement the data center according to the declarative specification.

The cloud platform independent declarative specification specifies dependencies between services, for example, start dependencies for each service listing all services that should be running when a particular service is started. The datacenter generation module 220 generates the cloud platform specific detailed metadata representation of the data center that includes information describing these dependencies such that the instructions for deploying the service ensure that the cloud platform starts the services in an order specified by the dependencies such that for each service, the services required to be started before the service are running when the service is started. Accordingly, the dependencies between services represent a dependency graph and the cloud platform starts running the services in an order determined based on the dependency graph such that if service A depends on service B, the service B is started before service A is started.

The datacenter generation module 220 creates trust relationships between user accounts that allow services to access other services via secure communication channels. These trust relationships are generated using substrate specific instructions generated based on the declarative specification, for example, based on outbound access attributes specified for services. The datacenter generation module 220 sends instructions to the cloud platform to create network policies based on cloud platform specific mechanisms that control the interactions and access across service groups and services, for example, as specified by the constructs of the declarative specification such as outbound access, security groups, security policies and so on.

The datacenter generation module 220 deploys the cloud platform specific metadata representation 530 on the specific target cloud platform for which the representation was generated. The datacenter generation module 220 may perform various validations using the generated metadata representations, including policy validations, format validations, and so on. The cloud platform independent declarative specification 510 may be referred to as a declared data center representation, cloud-platform independent detailed metadata representation 520 referred to as a derived metadata representation of the data center, and cloud platform specific metadata representation 530 referred to as a hydrated metadata representation of the data center.

Overall Process for Deployment of Software Artifacts on a Datacenter

Figure 6:
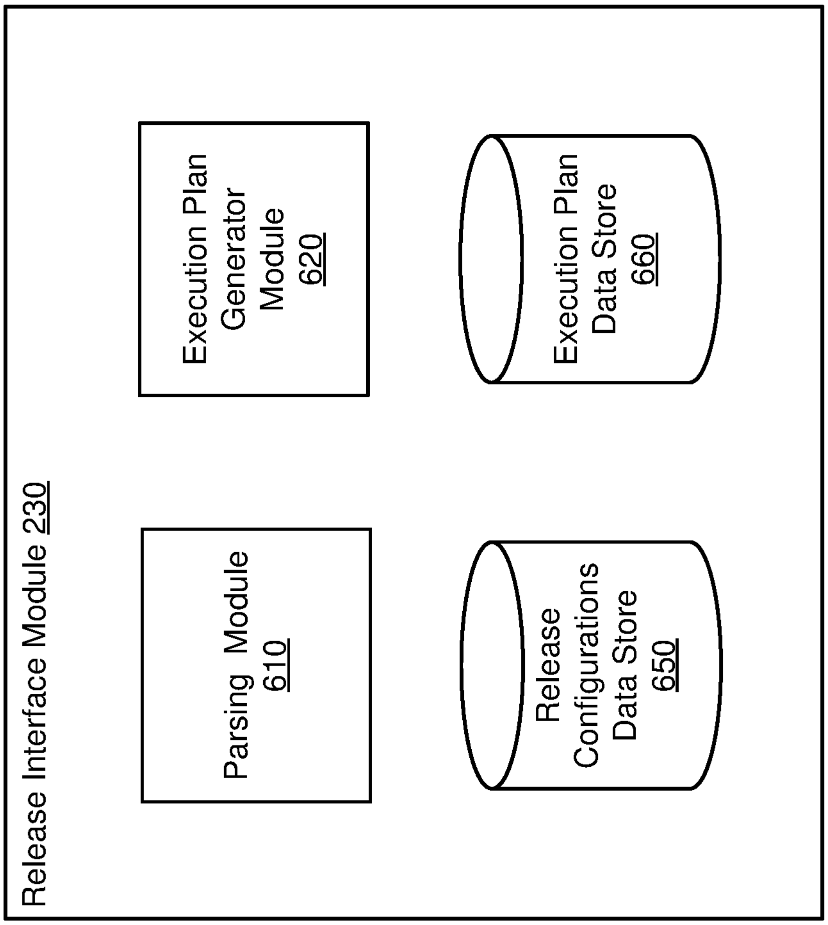
FIG. 6 is a block diagram illustrating the architecture of a release orchestration system, according to one embodiment.

FIG. 6 is a block diagram illustrating the architecture of a release interface system 230 according to one embodiment. The release interface module 230 includes a parsing module 610 and an execution plan generator module 620. The release interface module 230 also includes release configurations data store 650 and an execution plans data store 660. Other embodiments may include more, fewer, or different modules than those indicated in FIG. 6.

The parsing module 610 parses various types of user input including declarative specifications of data centers, release configurations data store 650, and pipeline templates. The parsing module 610 generates data structures and metadata representations of the input processed and provides the generated data structures and metadata representations to other modules of the release interface module 230 for further processing.

The release configurations data store 650 store release configurations received from the release configuration module 222 that each specifies orchestration of releases of one or more software artifacts for services. As described above in conjunction with FIG. 2, the release configuration may specify a variable representing a placeholder for one or more elements of the release. In one instance, a variable represents a placeholder for a version of the software artifact to be deployed on the one or more target datacenter entities. In another instance, a variable represents a placeholder for a version of the pipeline template for use during deployment.

In one embodiment, the release configuration may also specify one or more promotion decisions that determine when the software artifact is ready for promotion from one stagger group to the next stagger group. In one embodiment, the promotion decision is specified based on test case results obtained by datacenter entities. For example, if more than a threshold number or proportion of test cases are passed, the promotion decision may indicate that the software artifact be release to the next stagger group. The last stagger group, for example, may not have a promotion decision since there is no subsequent stagger group to which the software artifact needs to be promoted to.

The following is an example release configuration for instances of a rosstest service. Specifically, the release configuration below includes a variable (underlined portion below) that represents a placeholder for a version of the software artifact to be deployed on one or more target datacenter entities and in particular, for the software artifact RosstestDeployArtifactMappingLatest. In one instance, the variable describes one or more characteristics of the element that a user desires to be used for the release. For example, the variable for the version of the software artifact may be one of "latest" that specifies the most recent version of the software artifact registered in the artifact and metadata governance module 260, "stable" that specifies the version of the software artifact that passed one or more tests, and the like.

```
releaseFlows:
  -  name: "RosstestCDReleaseFlow"
     staggerFlow:
       name: "RosstestCDReleaseStaggerFlow"
       staggerGroups:
         -  name: "dev"
            selectors:
              gridType: "commercial"
              envType: "dev"
              instanceType: "serviceInstance"
              instanceId: "rossdev1"
              functionalDomain: "deploy"
              datacenterInstance: "dev2-uswest2 | dev1-uswest2"
            next:
              -        "test"
            exitCriteria:
              promotionStrategies:
              -        type: "soakTime"
                       parameters:
                         duration: "PT60m"
         -  name: "test"
            selectors:
              gridType: "commercial"
              envType: "test"
              instanceType: "serviceInstance"
              instanceId: "rosstest1"
              functionalDomain: "deploy"
              datacenterInstance: "aws-test2-uswest2"
     serviceFlow:
       name: "RosstestCdReleaseServiceFlow"
       servicePipelineFlows:
         -  name: "RosstestDeployFlow"
            serviceType: "rosstest"
            pipelineFlow:
              -        pipelineName: "deploy-eks-rosstest"
                       next: null
            next: null
     next: null
rolloutStrategy:
  retryStrategy:
     type: "fixedBackoffRetry"
     parameters:
       maxAttempts: 3
```

-continued

```
       askBeforeRetry: false
       ignoreFailureWithoutRetrying: false
       ignoreFailureAfterMaxTriesReached: false
       retryBackoffPeriod: "PT30s"
releaseArtifacts:
  -  name: "RosstestDeployArtifactMappingLatest"
     serviceType: "rosstest"
     pipelineArtifactSets:
     -  pipelineName: "deploy-eks-rosstest"
        versionLabel: "stable"
        artifactVersionSet:
          artifactSetResourceId: "rosstest"
```

Similarly, the release configuration may include a variable that represents a placeholder for a version of the pipeline template to be used for deployment of the artifacts to target datacenter entities. For example, the variable for the version of the pipeline template may be one of "latest" that specifies the most recent version of the pipeline template registered, "stable" that specifies the version of the pipeline template that passed one or more tests, and the like.

The release configuration also specifies a stagger flow including one or more stagger groups, where each stagger group specifies a subset of target datacenter entities for which the software artifact can be released in parallel. In the example release configuration above, the stagger flow includes a dev stagger group with selectors that indicate the target datacenter entities are service instances within datacenters of environment type dev (development), service instance ID rossdev1, and datacenter instances dev2-uswest2 or dev1-uswest2. Thus, this stagger group specifies all service instances for which the software artifact will be deployed based on the selector criteria in the release configuration.

The stagger flow also specifies a promotion criteria that defines one or more rules for when the software release is allowed to proceed to the target datacenter entities in the next stagger group. In the example release configuration above, the promotion criteria after the release for the dev stagger group has been completed is to wait 60 seconds of soak time before proceeding to the next test stagger group.

The stagger flow also includes a test stagger group with selectors that indicate the target datacenter entities are service instances within datacenters of environment type test (test), service instance ID rosstest 1, and datacenter instance test 2-uswest2. Thus, the stagger group specifies all service instances for which the software artifact will be deployed based on the selector criteria in the release configuration.

Responsive to receiving a version set event from the artifact and metadata governance module 260, the execution plan generator module 620 generates an execution plan from the release configuration. The execution plan is stored in the execution plan data store 660. The execution plan is an artifact that hydrates a release configuration into actual values and identifiers for the variables as well as target datacenter entities specified, for example, in each stagger group. The execution plan generator module 620 identifies release configurations that are associated with the artifacts in the version set event. The execution plan generator module 620 compiles the execution plan from the identified release configurations.

In one embodiment, the execution plan generator module 620 compiles the execution plan based on information retrieved from the cloud platform specific datacenter representations and the artifact and metadata governance module 260. In one embodiment, the execution plan generator module 620 resolves the elements represented by the one or more variables specified in the release configuration by resolving the specific values for the variables in the compiled execution plan. For example, an execution plan may resolve the variables with the actual versions of the software artifacts or with actual versions of the pipeline templates that match the characteristics specified by the user for the variables.

The following is an example execution plan generated based on the example release configuration described above. Specifically, the execution plan below includes resolved identifiers for the variable representing the version of the software artifact as “releaseVersion: RosstestDeployArtifact. 1.0.4,” that is identified as the stable version of the artifact from the artifact and metadata governance module 260. The execution plan below also includes resolved pipelines “deploy-eks-rosstest-dev2-uswest2-deploy-ecr-rosstest-stable” for target services instance “rossdev1” within datacenter “aws-dev2-uswest2,” and “deploy-eks-ecr-rosstest-aws-test2-uswest2-deploy-ecr-rosstest-stable” for target services instance “rosstest1” within datacenter “test2-uswest2.”

```
{
  “releaseApiShardId” : “test-releaseapi-1”,
  “releaseDeclarationId” : “xxxxx-yyyyy-zzzzz”,
  “staggerFlows” : [ {
    “name” : “RosstestCDReleaseFlow”,
    “staggerGroups” : [ {
      “name” : “dev”,
      “exitCriteria” : {
        “promotionStrategies” : [ {
          “type” : “soakTime”,
          “parameters” : {
            “duration” : “PT60m”   }
        } ]
      },
      “rolloutStrategies” : [ ],
      “servicePipelineFlows” : [ {
        “name” : “RosstestDeployFlow”,
        “service” : “rosstest”,
        “pipelineFlows” : [ {
          “name” : “deploy-eks-rosstest”,
          “pipelineTemplate” : “deploy-eks-rosstest”,
          “pipelineExecutions” : [ {
            “datacenterTarget” : {
              “datacenterInstance” : “dev2-uswest2”,
              “functionalDomain” : “deploy”,
              “serviceInstanceId” : “rossdev1”,
              “serviceType” : “rosstest” },
            “pipelineContext” : {
              “resolvedPipelineId” : “11111-22222-33333-44444-
55555”,
              “spinnakerApplicationName” : “RosstestCDRelease”,
              “spinnakerPipelineName” : “deploy-eks-rosstest-dev2-
uswest2-deploy-ecr-rosstest-stable”,
              “pipelineName” : “deploy-eks-rosstest”,
              “label” : “stable” },
            “pipelineTriggerFilePath” :
“/path/to/pipelineTrigger” } ],
          “next” : [ ]
    . . .
      “releasePolicies” : [ ]
    }, {
      “name” : “test”,
      “exitCriteria” : {
        “promotionStrategies” : [ ]
      },
      “rolloutStrategies” : [ ],
      “servicePipelineFlows” : [ {
        “name” : “RosstestDeployFlow”,
        “service” : “rosstest”,
        “pipelineFlows” : [ {
          “name” : “deploy-eks-rosstest”,
          “pipelineTemplate” : “deploy-eks-rosstest”,
```

-continued

```
          “pipelineExecutions” : [ {
            “datacenterTarget” : {
              “datacenterInstance” : “test2-uswest2”,
              “functionalDomain” : “deploy”,
              “serviceInstanceId” : “rosstest1”,
              “serviceType” : “rosstest”   },
            “pipelineContext” : {
              “resolvedPipelineId” : “11111-22222-33333-44444-
55555”,
              “spinnakerApplicationName” : “RosstestCDRelease”,
              “spinnakerPipelineName” : “deploy-eks-rosstest-
test2-uswest2-deploy-ecr-rosstest-stable”,
              “pipelineName” : “deploy-eks-rosstest”,
              “label” : “stable”   },
            “pipelineTriggerFilePath” :
“/path/to/pipelineTrigger”   } ],
        . . .
          “releaseArtifacts”: {
      “releaseVersion”: “releaseVersion:
RosstestDeployArtifact.1.0.4”,
      “versionSets”: [
        {
          “service”: “rosstest”,
          “pipelineTemplateName”: “deploy-eks-rosstest”,
          “versionsetId”: “uuuuu-wwwwww-yyyyyy-zzzzzz”,
          “artifactVersions”: [
            {
```

In one embodiment, the deployment module 210 may orchestrate release of software artifacts by receiving, from one or more uses, an artifact version map that associates various software artifacts and their versions with datacenter entities. The artifact version map thus is a declarative specification of the specific versions of software artifacts that need to be deployed for services in different datacenter entities. The deployment module 210 generates master pipelines and instructions that ensure that the appropriate software artifact versions are deployed in the datacenter entities as specified in the artifact version map.

In one embodiment, the master pipeline includes instructions for performing operations related to software releases for different environments, and is a hierarchical pipeline in which each stage of a pipeline may comprise a pipeline with detailed instructions for executing the stage. The master pipeline hierarchy may mirror the datacenter hierarchy. For example, the top level of the master pipeline represents a sequence of stages for different environments. Each environment may include one or more pipelines for datacenter instances or pipelines for other types of datacenter entities.

In such an embodiment, a user (e.g., application developer) desiring to deploy a software artifact manually hardcodes the software artifact version map to reflect the updated version of the software artifact or an updated version of the pipeline for the service. Moreover, the user manually hardcodes the different software artifact version maps that correspond to each stage (e.g., development environment, test environment, etc.) in the master pipeline as one stage is promoted to the next stage. This process introduces significant manual errors and compliance violations that may cause the user or the administrators of the deployment module 210 to spend a significant amount of time and resources addressing the errors. Moreover, the flows according to master pipelines may be relatively static in that the master pipeline is fixed to environment types of the datacenter entities and do not flexibly account for different and complex release processes from different business units of the multi-tenant system 110.

By orchestrating the software artifacts based on the release orchestration system 230 described in conjunction with the system environment 100 described herein, the user simply specifies in the release configuration for a software artifact variables that are placeholders for the actual versions for the software artifact and the pipeline, and the execution plan generator module 620 automatically may retrieve the appropriate versions of the software artifact and the pipeline such that the versions are resolved in the execution plan. Moreover, the user may specify the stagger flow in the release configuration that specifies the order in which software is released and deployed on each subset of target datacenter entities corresponding to each stagger group. The datacenter entities are specified in a flexible manner using selectors in the release configuration and the release orchestration system 200 also coordinates with instances and shards of the release platform to execute pipelines according to the stagger flow. This provides a more efficient software release experience for application developers.

Figure 7:
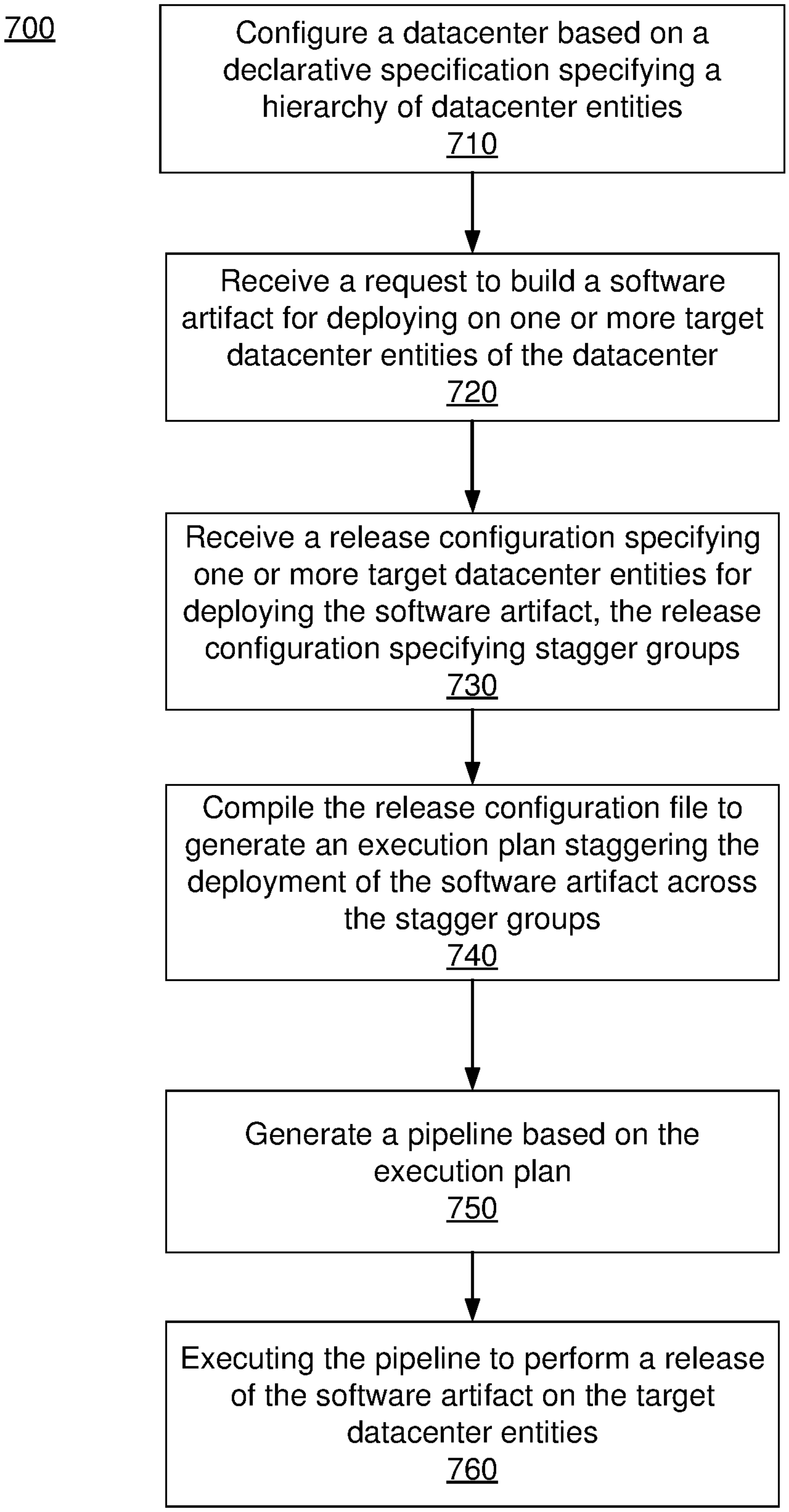
FIG. 7 shows the overall process for generating execution plans from release configurations for deployment of software artifacts on datacenters configured on a cloud platform according to an embodiment.

FIG. 7 shows the overall process for generating execution plans from release configurations for deployment of software artifacts on datacenters configured on a cloud platform according to an embodiment. The datacenter generation module 220 configures 710 one or more datacenters on a target cloud platform. Each datacenter is generated from a cloud platform independent declarative specification and has a hierarchy of datacenter entities.

The release orchestration system 200 receives 720 a request to build a software artifact for deploying on one or more target datacenter entities of the datacenter configured on the cloud platform. The release orchestration system 200 receives 730 a release configuration specifying one or more target datacenter entities for deploying the software artifact. In one embodiment, the release configuration specifies a plurality of stagger groups, each stagger group representing a subset of the plurality of datacenter entities. The release orchestration system 200 compiles 740 the release configuration file to generate an execution plan. In one embodiment, the execution plan staggers the deployment of the particular software artifact across the plurality of stagger groups. In one embodiment, the release orchestration system 200 repeats for each stagger group, deploying the particular software artifact to a stagger group, and waiting for a threshold time before deploying the particular software artifact to a next stagger group. The release orchestration system 200 generates 750 a pipeline based on the version map. The release orchestration system 200 executes 760 the pipeline to perform a release of the software artifact on the target datacenter entities.

Example Orchestration of Software Artifacts Across Stagger Groups

Figure 8:
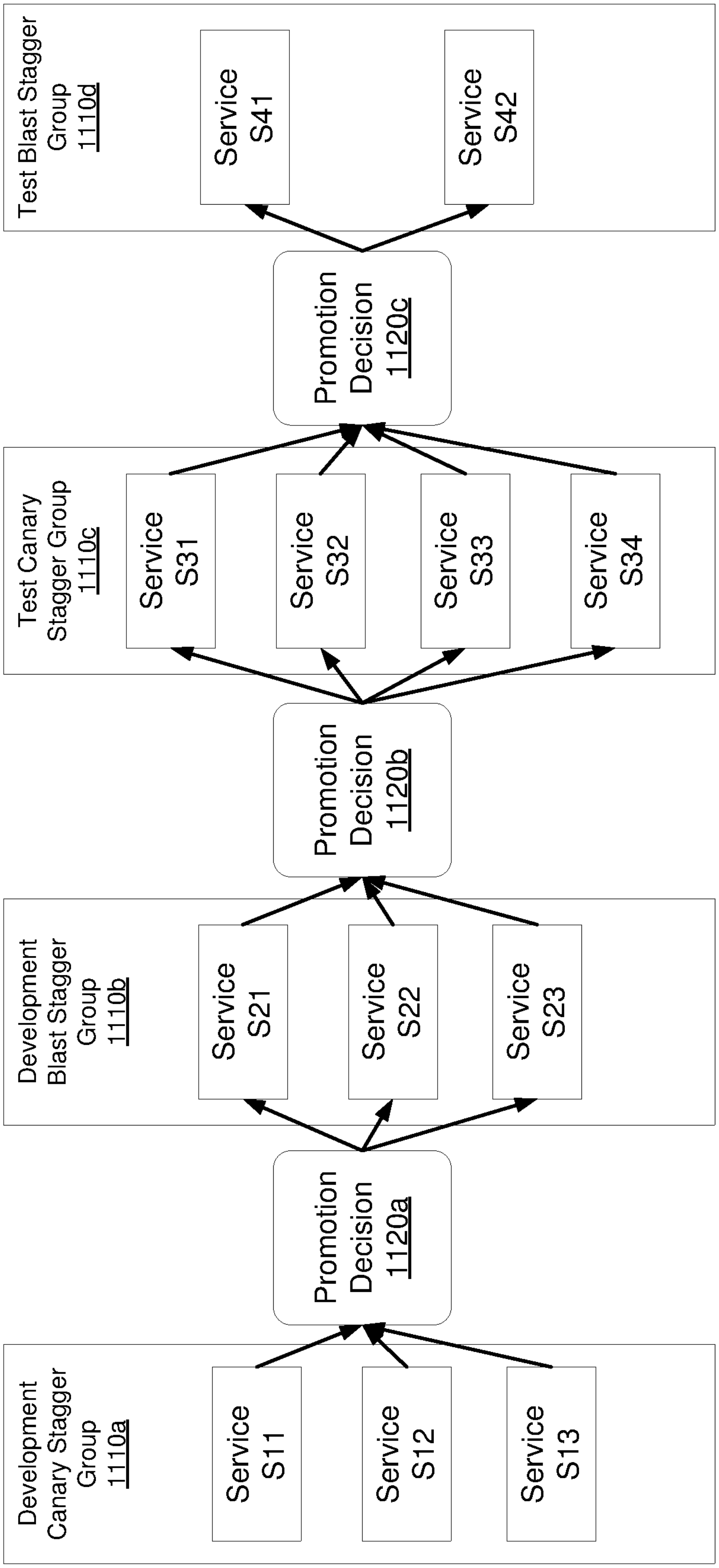
FIG. 8 shows an example release orchestration of a software artifact across stagger groups, according to an embodiment.

FIG. 8 shows an example release orchestration of a software artifact across stagger groups, according to one or more embodiments. As shown in FIG. 8, the release orchestration system 200 may receive an indication to release and deploy a software artifact on target datacenter entities according to a stagger flow. The release may be associated with one or more pipeline templates that govern how the release of the software artifact is deployed on datacenter entities. Specifically, the stagger groups include a development canary stagger group 1110*a* including service instances S11, S12, S13. The service instances may reside in different datacenter instances. Similarly, the stagger groups also include a development blast stagger group 1110*b* including service instances S21, S22, S23, a test canary stagger group 1110*c* including service instances S31, S32, S33, S34, and a test blast stagger group 1110*d* including service instances S41, S42.

Moreover, the promotion decision 1120*a* specifies when the release and deployment of the software artifact can proceed from the development canary stagger group 1110*a* to the development blast stagger group 1110*b*, the promotion decision 1120*b* specifies when the release and deployment can proceed from the development blast stagger group 1110*b* to the test canary stagger group 1110*c*, and the promotion decision 1120*c* specifies when the release and deployment can proceed from the test canary stagger group 1110*c* to the test blast stagger group 1110*d*. Specifically, the promotion decision 1120*a* may specify that no failures are allowed from the development canary stagger group 1110*a* and similarly, the promotion decision 1120*c* may specify that no failures are allowed from the test canary stagger group 1110*c*.

As described above, each stagger group and promotion decisions may be specified in the release configuration 222 and resolved in the execution plan 235 generated by the release interface module 230.

The release executor module 240 may receive the execution plan and generate a workflow composed of one or more step functions. For example, the release executor module 240 may generate a step function corresponding to each service instance S11, S12, and S13 in the development canary stagger group 1110*a*. The release executor module 240 may determine a release platform instance or shard that will execute the pipeline for the release and deployment of the software artifact for these service instances. In addition, the pipeline generator module 270 may generate a materialized pipeline from the pipeline templates based on the target service instances. The step function generates an event to the release platform abstraction module 245 with execution information, such that the release platform abstraction module 245 triggers execution of the pipelines by the identified release platform shards.

The release platform abstraction module 245 receives a response from the release platform shard indicating whether the execution was successful or if there were one or more errors. The release platform abstraction module 245 provides the notification to the step function of the release executor module 240. In particular, the release executor module 240 may determine whether the promotion criteria in promotion decision 1120*a* was satisfied for the release on service instances S11, S12, S13. If so, the next step function corresponding to service instances S21, S22, S23 in the development blast stagger group 1110*b* may be called, and the process may be repeated until the software is released and deployed for service instances in the last test blast stagger group 1110*d*.

Computer Architecture

Figure 9:
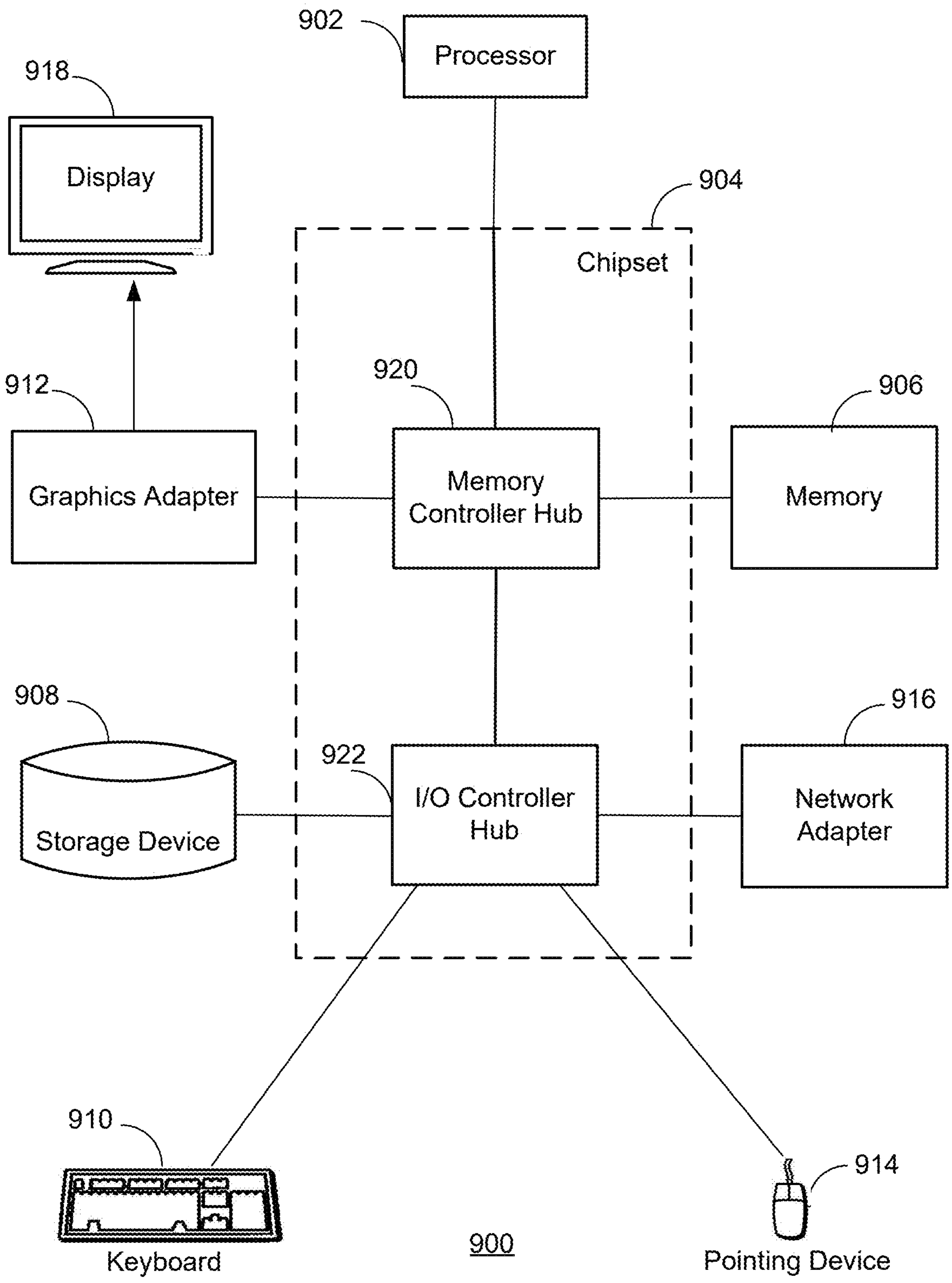
FIG. 9 Prior Art
FIG. 9 is a block diagram illustrating a functional view of a typical computer system for use in the environment of FIG. 1 according to one embodiment.

FIG. 9 is a high-level block diagram illustrating a functional view of a typical computer system for use as one of the entities illustrated in the environment 100 of FIG. 1 according to an embodiment. Illustrated are at least one processor 902 coupled to a chipset 904. Also coupled to the chipset 904 are a memory 906, a storage device 908, a keyboard 910, a graphics adapter 912, a pointing device 914, and a network adapter 916. A display 918 is coupled to the graphics adapter 912. In one embodiment, the functionality of the chipset 904 is provided by a memory controller hub 920 and an I/O controller hub 922. In another embodiment, the memory 906 is coupled directly to the processor 902 instead of the chipset 904.

The storage device 908 is a non-transitory computer-readable storage medium, such as a hard drive, compact disk read-only memory (CD-ROM), DVD, or a solid-state memory device. The memory 906 holds instructions and data used by the processor 902. The pointing device 914 may be a mouse, track ball, or other type of pointing device, and is used in combination with the keyboard 910 to input data into the computer system 900. The graphics adapter 912 displays images and other information on the display 918. The network adapter 916 couples the computer system 800 to a network.

As is known in the art, a computer 900 can have different and/or other components than those shown in FIG. 9. In addition, the computer 900 can lack certain illustrated components. For example, a computer system 800 acting as a multi-tenant system 110 may lack a keyboard 810 and a pointing device 814. Moreover, the storage device 808 can be local and/or remote from the computer 800 (such as embodied within a storage area network (SAN)).

The computer 900 is adapted to execute computer modules for providing the functionality described herein. As used herein, the term "module" refers to computer program instruction and other logic for providing a specified functionality. A module can be implemented in hardware, firmware, and/or software. A module can include one or more processes, and/or be provided by only part of a process. A module is typically stored on the storage device 908, loaded into the memory 906, and executed by the processor 902.

The types of computer systems 900 used by the entities of a system environment can vary depending upon the embodiment and the processing power used by the entity. For example, a client device may be a mobile phone with limited processing power, a small display 918, and may lack a pointing device 914. A multi-tenant system or a cloud platform, in contrast, may comprise multiple blade servers working together to provide the functionality described herein.

Additional Considerations

The particular naming of the components, capitalization of terms, the attributes, data structures, or any other programming or structural aspect is not mandatory or significant, and the mechanisms that implement the embodiments described may have different names, formats, or protocols. Further, the systems may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present features in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain embodiments described herein include process steps and instructions described in the form of an algorithm. It should be noted that the process steps and instructions of the embodiments could be embodied in software, firmware or hardware, and when embodied in software, could be downloaded to reside on and be operated from different platforms used by real time network operating systems.

The embodiments described also relate to apparatuses for performing the operations herein. An apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMS, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the, along with equivalent variations. In addition, the present embodiments are not described with reference to any particular programming language. It is appreciated that a variety of programming languages may be used to implement the teachings of the embodiments as described herein.

The embodiments are well suited for a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes and may not have been selected to delineate or circumscribe the inventive subject matter. Accordingly, the disclosure of the embodiments is intended to be illustrative, but not limiting.

What is claimed is:

1. A computer implemented method for continuous delivery of software artifacts on one or more cloud platforms, the method comprising:

configuring a datacenter on a cloud platform based on a declarative specification specifying a hierarchy of datacenter entities;

receiving a request to build a set of software artifacts;

receiving a release configuration comprising information for deploying the set of software artifacts on the datacenter, wherein a particular software artifact is targeted for deployment on a plurality of datacenter entities, the release configuration including one or more variables representing selectors specifying a plurality of stagger groups, each stagger group representing a subset of the plurality of datacenter entities;

compiling the release configuration to generate an execution plan for deploying the set of software artifacts, the compiling including determining one or more service instances for each stagger group based on the declarative specification, the one or more service instances corresponding to one or more of the selectors, the execution plan staggering the deployment of the particular software artifact across the plurality of stagger groups by repeating for each stagger group:

deploying the particular software artifact to a stagger group; and waiting for a threshold time before deploying the particular software artifact to a next stagger group;

generating a set of pipelines based on the execution plan, each pipeline being generated from a pipeline template; and executing the set of pipelines to deploy the set of software artifacts on the datacenter, wherein at least a first stagger group is a canary group and a second stagger group that is the next stagger group is a blast group, and wherein the execution plan further specifies a promotion criteria for the first stagger group allowing a pipeline of the set of pipelines to be executed in the second stagger group if there are less than a threshold number or proportion of failures in executing of the pipeline in the first stagger group.

2. The computer implemented method of claim 1, wherein the selectors represent one or more placeholders for at least one element of the release configuration.

3. The computer implemented method of claim 2, wherein the at least one element includes one or more of a version of the particular software artifact to be deployed, a version of the pipeline template for use during deployment, or another subset of the plurality of datacenter entities for deploying in parallel.

4. The computer implemented method of claim 1, wherein for at least two stagger groups in the plurality of stagger groups, the subset of the plurality of datacenter entities for the at least two stagger groups are of a same environment type.

5. The computer implemented method of claim 1, wherein executing the set of pipelines further comprises generating one or more step functions of a workflow based on the execution plan, and wherein a step function triggers execution of a pipeline to a respective stagger group in the plurality of stagger groups.

6. The computer implemented method of claim 1, further comprising:

determining a first set of release platform shards for executing a pipeline for a subset of datacenter entities of a first stagger group; and determining a second set of release platform shards for executing a pipeline for another subset of datacenter entities of a second stagger group.

7. The computer implemented method of claim 6, wherein executing the set of pipelines further comprises generating an event message to trigger execution of the pipeline by the first set of release platform shards and generating another event message to trigger execution of the pipeline by the second set of release platform shards.

8. The computer implemented method of claim 1, the canary group including multiple service instances residing in different datacenter instances.

9. A non-transitory computer readable storage medium storing thereon computer-readable instructions that when executed by a computer processor cause the computer processor to perform steps comprising:

configuring a datacenter on a cloud platform based on a declarative specification specifying a hierarchy of datacenter entities;

receiving a request to build a set of software artifacts;

receiving a release configuration comprising information for deploying the set of software artifacts on the datacenter, wherein a particular software artifact is targeted for deployment on a plurality of datacenter entities, the release configuration including one or more variables representing selectors specifying a plurality of stagger groups, each stagger group representing a subset of the plurality of datacenter entities;

compiling the release configuration to generate an execution plan for deploying the set of software artifacts, the compiling including determining one or more service instances for each stagger group based on the declarative specification, the one or more service instances corresponding to one or more of the selectors, the execution plan staggering the deployment of the particular software artifact across the plurality of stagger groups by repeating for each stagger group:

deploying the particular software artifact to a stagger group; and waiting for a threshold time before deploying the particular software artifact to a next stagger group;

generating a set of pipelines based on the execution plan, each pipeline being generated from a pipeline template; and executing the set of pipelines to deploy the set of software artifacts on the datacenter, wherein at least a first stagger group is a canary group and a second stagger group that is the next stagger group is a blast group, and wherein the execution plan further specifies a promotion criteria for the first stagger group allowing a pipeline of the set of pipelines to be executed in the second stagger group if there are less than a threshold number or proportion of failures in executing of the pipeline in the first stagger group.

10. The non-transitory computer readable storage medium of claim 9, wherein the selectors represent one or more placeholders for at least one element of the release configuration.

11. The non-transitory computer readable storage medium of claim 10, wherein for at least two stagger groups in the plurality of stagger groups, the subset of the plurality of datacenter entities for the at least two stagger groups are of a same environment type.

12. The non-transitory computer readable storage medium of claim 9, wherein executing the set of pipelines further comprises generating one or more step functions of a workflow based on the execution plan, and wherein a step function triggers execution of a pipeline to a respective stagger group in the plurality of stagger groups.

13. The non-transitory computer readable storage medium of claim 9, wherein the computer-readable instructions for executing the set of pipelines further comprises:

determining a first set of release platform shards for executing a pipeline for a subset of datacenter entities of a first stagger group; and determining a second set of release platform shards for executing a pipeline for another subset of datacenter entities of a second stagger group.

14. The non-transitory computer readable storage medium of claim 13, wherein instructions for executing the set of pipelines further comprises generating an event message to trigger execution of the pipeline by the first set of release platform shards and generating another event message to trigger execution of the pipeline by the second set of release platform shards.

15. A computer system comprising:

a computer processor; and a non-transitory computer readable storage medium for storing instructions that when executed by the computer processor, cause the computer processor to perform steps comprising:

configuring a datacenter on a cloud platform based on a declarative specification specifying a hierarchy of datacenter entities;

receiving a request to build a set of software artifacts;

receiving a release configuration comprising information for deploying the set of software artifacts on the datacenter, wherein a particular software artifact is targeted for deployment on a plurality of datacenter entities, the release configuration including one or more variables representing selectors specifying a plurality of stagger groups, each stagger group representing a subset of the plurality of datacenter entities;

compiling the release configuration to generate an execution plan for deploying the set of software artifacts, the compiling including determining one or more service instances for each stagger group based on the declarative specification, the one or more service instances corresponding to one or more of the selectors, the execution plan staggering the deployment of the particular software artifact across the plurality of stagger groups by repeating for each stagger group:

deploying the particular software artifact to a stagger group; and waiting for a threshold time before deploying the particular software artifact to a next stagger group;

generating a set of pipelines based on the execution plan, each pipeline being generated from a pipeline template; and executing the set of pipelines to deploy the set of software artifacts on the datacenter, wherein at least a first stagger group is a canary group and a second stagger group that is the next stagger group is a blast group, and wherein the execution plan further specifies a promotion criteria for the first stagger group allowing a pipeline of the set of pipelines to be executed in the second stagger group if there are less than a threshold number or proportion of failures in executing of the pipeline in the first stagger group.

16. The computer system of claim 15, wherein the selectors represent one or more placeholders for at least one element of the release configuration.

17. The computer system of claim 15, wherein for at least two stagger groups in the plurality of stagger groups, the subset of the plurality of datacenter entities for the at least two stagger groups are of a same environment type.

18. The computer system of claim 15, wherein executing the set of pipelines further comprises generating one or more step functions of a workflow based on the execution plan, and wherein a step function triggers execution of a pipeline to a respective stagger group in the plurality of stagger groups.

19. The computer system of claim 15, the instructions for executing the set of pipelines further comprising:

determining a first set of release platform shards for executing a pipeline for a subset of datacenter entities of a first stagger group; and determining a second set of release platform shards for executing a pipeline for another subset of datacenter entities of a second stagger group.

* * * * *